United States Patent
Gleeson et al.

(10) Patent No.: US 11,541,261 B2
(45) Date of Patent: Jan. 3, 2023

(54) SYSTEM FOR MAINTAINING INTEGRITY OF A DRY PIPE SYSTEM WITH HEATED CABINET AND FLOW RESTRICTOR VALVE

(71) Applicant: AGF Manufacturing Inc., Malvern, PA (US)

(72) Inventors: Bentley F. Gleeson, Plymouth Meeting, PA (US); Michael B. Ferrucci, Mont Clare, PA (US); George J. McHugh, IV, Malvern, PA (US); James P. McHugh, Newtown Square, PA (US)

(73) Assignee: AGF MANUFACTURING INC., Malvern, PA (US)

( * ) Notice: Subject to any disclaimer, the term of this patent is extended or adjusted under 35 U.S.C. 154(b) by 193 days.

(21) Appl. No.: 16/884,281

(22) Filed: May 27, 2020

(65) Prior Publication Data

US 2021/0370114 A1    Dec. 2, 2021

(51) Int. Cl.
*A62C 35/68*    (2006.01)
*A62C 35/62*    (2006.01)

(52) U.S. Cl.
CPC ............. *A62C 35/68* (2013.01); *A62C 35/62* (2013.01)

(58) Field of Classification Search
CPC ....... A62C 3/004; A62C 35/62; A62C 35/645; A62C 35/68; A62C 37/50
See application file for complete search history.

(56) References Cited

U.S. PATENT DOCUMENTS

| | | | |
|---|---|---|---|
| 2,819,799 A | 1/1958 | Wilkerson | |
| 5,921,270 A | 7/1999 | Mccarty | |
| 6,102,066 A * | 8/2000 | Craig | A62C 35/62 169/17 |
| 6,443,173 B1 * | 9/2002 | Thompson, Jr. | F16T 1/00 169/17 |
| 7,766,031 B2 * | 8/2010 | Platusich | F16T 1/14 137/625.46 |
| 8,443,908 B2 * | 5/2013 | McHugh, IV | A62C 35/62 169/17 |
| 2002/0002995 A1 | 1/2002 | Wood | |
| 2002/0121302 A1 | 9/2002 | Thompson, Jr. | |
| 2008/0277125 A1 | 11/2008 | Wilkins et al. | |

(Continued)

FOREIGN PATENT DOCUMENTS

| | | |
|---|---|---|
| DE | 10 2014 211 900 B4 | 7/2018 |
| WO | 95/20117 A1 | 7/1995 |

OTHER PUBLICATIONS

Partial European Search Report dated Oct. 29, 2021, by the European Patent Office in corresponding European Patent Application No. 21176224.0-1113. (12 pages).

(Continued)

*Primary Examiner* — Darren W Gorman

(74) *Attorney, Agent, or Firm* — Panitch Schwarze Belisario & Nadel LLP

(57) ABSTRACT

A system and method for maintaining the integrity of a dry pipe sprinkler system. The system can includes an auxiliary drain including a main collection pipe, a heater having a bracket configured to attach the heater to the main collection pipe of the auxiliary drain, the bracket including a deflector configured to direct heat from the heater onto the main collection pipe, and a self-draining apparatus configured to receive excess water from the auxiliary drain.

16 Claims, 10 Drawing Sheets

(56) References Cited

U.S. PATENT DOCUMENTS

| | | | |
|---|---|---|---|
| 2009/0020166 A1* | 1/2009 | McHugh, IV | A62C 35/68 |
| | | | 137/314 |
| 2010/0326676 A1* | 12/2010 | Pecoraro | A62C 37/50 |
| | | | 169/16 |
| 2012/0273069 A1 | 11/2012 | Klicpera et al. | |
| 2014/0060652 A1 | 3/2014 | Mchugh | |
| 2017/0130970 A1* | 5/2017 | Ashcraft | F25D 21/08 |
| 2018/0064976 A1 | 3/2018 | Kochelek et al. | |
| 2019/0224513 A1* | 7/2019 | Goyette | A62C 37/50 |

OTHER PUBLICATIONS

The extended European Search Report dated Mar. 29, 2022, by the European Patent Office in corresponding European Patent Application No. 21176224.0-1113. (12 pages).

* cited by examiner

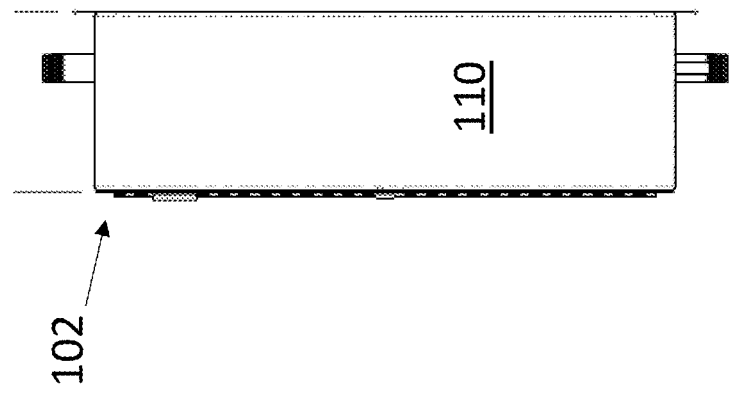
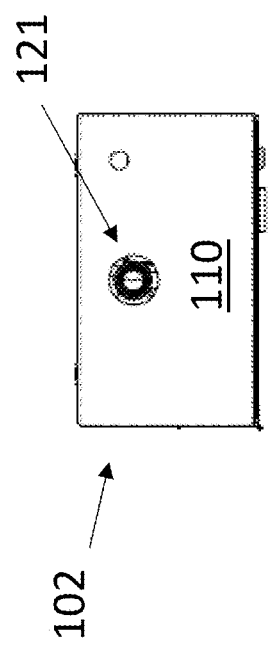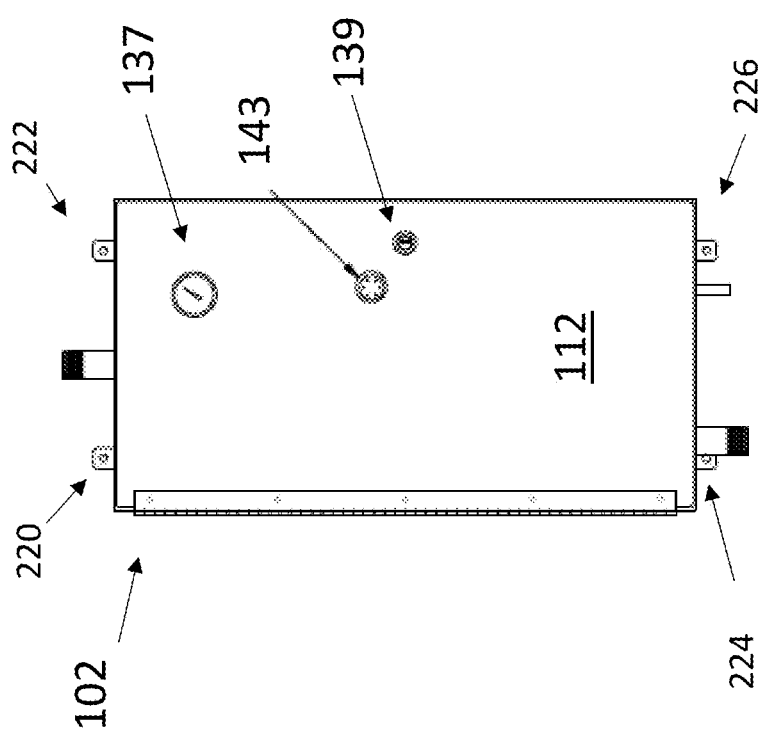

SYSTEM FOR MAINTAINING INTEGRITY OF A DRY PIPE SYSTEM WITH HEATED CABINET AND FLOW RESTRICTOR VALVE

FIELD OF DISCLOSURE

The present disclosure generally relates to dry pipe sprinkler systems or pre-action systems and in particular to a system for maintaining integrity of a dry pipe system in a heated cabinet with a mechanical drain trap and a Y-strainer, or a programmable logic controller with automatic valves, and an optional a flow restrictor valve.

BACKGROUND

A dry pipe sprinkler system or pre-action system comprises a fire suppression system that is typically used in structures and areas that are oftentimes unheated and subject to freezing temperatures. The dry pipe sprinkler system includes a network of pipes including branch lines servicing sprinkler heads, risers, and feed mains for delivering water from a water supply to the branch lines. Under normal conditions, this network of pipes contains a pressurized gas, such as air or nitrogen, which holds closed a dry pipe valve that connects the main supply pipes of main feeds of the sprinkler system to the water supply. When heat from a fire opens a sprinkler, the compressed gas is released from the system. The resulting drop in pressure causes the dry pipe valve to open, or trip, thereby releasing water into the main supply lines or main feeds.

When the network of pipes is filled with the pressurized gas and the ambient temperature lowers, condensate can collect in the network of pipes. If the condensate builds up in the system, then there is a risk that the condensate will freeze in the pipes. Freezing condensate can cause pipes to leak or burst, or inhibit the flow of water through the branch lines in the event of fire. For this reason, dry pipe systems often include one or more condensate collector arrangements (sometimes called an "auxiliary drain") which collect condensate from the network of pipes. These auxiliary drains are typically located at low points of the dry pipe system and usually include a drainage valve and a shut-off valve connecting the auxiliary drain to a low point. An auxiliary drain is drained of condensate by first closing the upper valve. This prevents pressurized gas from exiting the system when the auxiliary drain is being drained. The drain valve is then opened and condensate is drained from the auxiliary drain. Then the drain valve is closed again and the upper valve is reopened to again allow condensate to be collected.

A fully open or ruptured auxiliary drain will allow the compressed air inside of the dry system to rapidly vent. This will falsely trip the dry valve, allowing pressurized water to enter the dry portion of the system and a potentially damaging high flowrate will spill out of the open/broken auxiliary drain. In addition to occupant inconvenience, a compromised auxiliary drain can result in thousands of dollars in damage and repair costs plus, hours of maintenance/service time to restore the system to normal operation.

U.S. Patent Application Publication No. 2014/0060652 discloses an assembly having an auxiliary drain with a level switch, housed in an insulated cabinet with a heater. The heater monitors the temperature in the cabinet and turns on and off as needed to keep the accumulated condensation in the auxiliary drain from freezing. When the amount of water collected reaches a certain volume the level switch will activate and an audible and/or visual alert can be given that the auxiliary drain needs attention.

One of the factors working against an automatically draining auxiliary drain is the fact that building code currently requires that the outlet of an auxiliary drain terminate in either a cap or a plug. Typically, auxiliary drains have been located throughout a structure with little concern for incorporated draining, basically a maintenance worker goes around with a bucket or if temperatures are warm enough just dumps the contents of the auxiliary drain out onto the floor of the structure, giving a distinct rust color staining on the floor and walls near the auxiliary drain. However, as systems become more sophisticated and the desire for automation increases, it is anticipated that relevant building codes will be altered or Authority Having Jurisdiction's (AHJ's) will allow auto draining as long as accommodations have been made to drain the water safely so as not to cause a potential slip-and-fall situation.

BRIEF SUMMARY

In accordance with the above, it would be desirable to have a system for maintaining integrity of a dry pipe system in a heated cabinet with a mechanical drain trap and a Y-strainer, or a programmable logic controller with an automatic valve, and an optional a flow restrictor valve.

In accordance with an aspect, a system is disclosed for maintaining the integrity of a dry pipe sprinkler system, comprising: an auxiliary drain including a main collection pipe; a heater having a bracket configured to attach the heater to the main collection pipe of the auxiliary drain, the bracket including a deflector configured to direct heat from the heater onto the main collection pipe; and a self-draining apparatus configured to receive excess water from the auxiliary drain.

In accordance with another aspect, the self-draining apparatus includes: a Y-strainer in communication with a side port of an upper portion of the auxiliary drain, the Y-strainer configure to receive the excess water from the main collection pipe of the auxiliary drain; a drain trap arranged in parallel to the auxiliary drain and in communication with the Y-strainer, the drain trap having a float configured to release water from the drain trap upon the float lifting off a seat within the drain trap; and a drain tube extending from a lower portion of the drain trap and configured to receive the water released from the drain trap.

In accordance with an aspect, the self-draining apparatus includes a programmable logic controller configured to receive a signal from a level switch within the auxiliary drain when the excess water is detected in the main collection pipe of the auxiliary drain; and an automatic drain on a lower portion of the auxiliary drain, the automatic drain including a plurality of valves, each of the plurality of valves configured to receive signal from the programmable logic controller to release at least a portion of the excess water within the auxiliary drain though a drain pipe connected to the automatic drain.

In accordance with another aspect, a flow restrictor valve is disclosed, the flow restrictor valve comprising: a plunger configured to be held in an open position by a compression spring, the open position configured to allow a liquid or gas to flow through the flow restrictor valve and a closed position in which a flow of the liquid or gas generates a velocity sufficient to cause the compression spring to compress and engage an outer edge of the plunger with a seat of a retaining member to prevent the flow of the liquid or gas through the flow restrictor valve.

In accordance with a further aspect, a method is disclosed for maintaining the integrity of a dry pipe sprinkler system, comprising: providing an auxiliary drain including a main collection pipe; attaching a heater having a bracket to the main collection pipe of the auxiliary drain, the bracket including a deflector configured to direct heat from the heater onto the main collection pipe; and releasing excess water from the auxiliary drain with a self-draining apparatus, the self-draining apparatus configured to receive the excess water from the auxiliary drain

BRIEF DESCRIPTION OF THE DRAWINGS

FIG. 2A is a top view of the cabinet for the auxiliary drain and/or condensate collecting system as shown in FIG. 1.

FIG. 2B is a front view of the cabinet for the auxiliary drain and/or condensate collecting system as shown in FIG. 1 with the door closed.

FIG. 2C is a side view of the cabinet for the auxiliary drain and/or condensate collecting system as shown in FIG. 1.

DETAILED DESCRIPTION OF EXEMPLARY EMBODIMENTS

Set forth below with reference to the accompanying drawings is a detailed description of embodiments of a system for maintaining integrity of a dry pipe system in a heated cabinet with a mechanical drain trap and a Y-strainer, or a programmable logic controller with automatic valves, and an optional flow restrictor valve and representing examples of the disclosed system for maintaining integrity of a dry pipe system in the heated cabinet with the mechanical drain trap and the Y-strainer, the programmable logic controller with the automatic valves, and the flow restrictor valve.

In accordance with an exemplary embodiment, an auxiliary drain and/or condensate collecting system 100 is disclosed that can be either fully or semi-automated, and can reduce the possibility of human error inherent with the unskilled maintenance personnel typically tasked with maintaining the auxiliary drains. With current commodity type auxiliary drains there is no way of knowing how much condensation has accumulated and the drains lack the ability to alert personnel of their status and therefore to prevent freezing they require constant attention.

Figure 1:
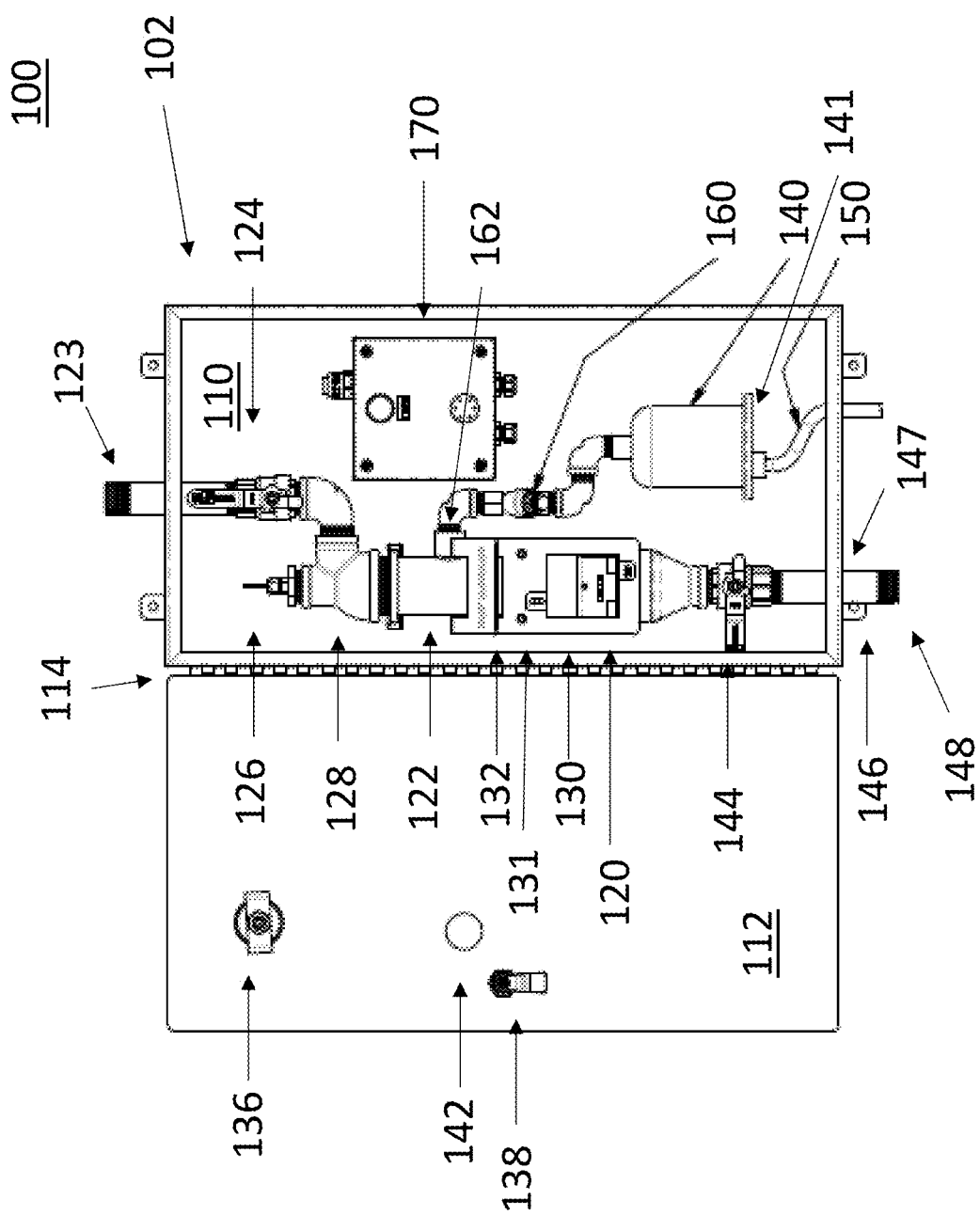
FIG. 1 is a front view of an auxiliary drain and/or condensate collecting system in accordance with an embodiment disclosed here.

FIG. 1 is a front view of an auxiliary drain and/or condensate collecting system 100 in accordance with an embodiment disclosed here. FIGS. 2A, 2B, and 2C are a top view, a front view, and a side view of the cabinet 102 for the auxiliary drain and/or condensate collecting system 100 as shown in FIG. 1. As shown in FIGS. 1, 2A, 2B, and 2C, the system 100 includes a cabinet 102 comprised of a housing 110 with a door 112 hinged, for example, on a piano hinge 114. In accordance with an exemplary embodiment, the housing 110 is configured to house an auxiliary drain 120, a heater 130 having a deflector plate 132, and a self-draining apparatus, for example, a mechanical drain trap 140, a second drain line (i.e., drain tube) 150, a Y-strainer 160, and an electrical enclosure 170.

The housing 110 and the door 112 may be made of steel and may be insulated with a foil faced foam board insulation to help retain heat. In accordance with an embodiment, the insulation has a thickness, for example, of ¼ inch to ¾ inch, for example ½ inch. The housing 110 may include a plurality of tabs 220, 222, 224, 226 (FIG. 2B) for mounting the housing 110 upon a concrete pillar, wall or other surface as may be desired or required. The door 112 can include a key lock 139 (FIG. 2B) and attendant latch 138 on the inside of door 112.

Figure 4:
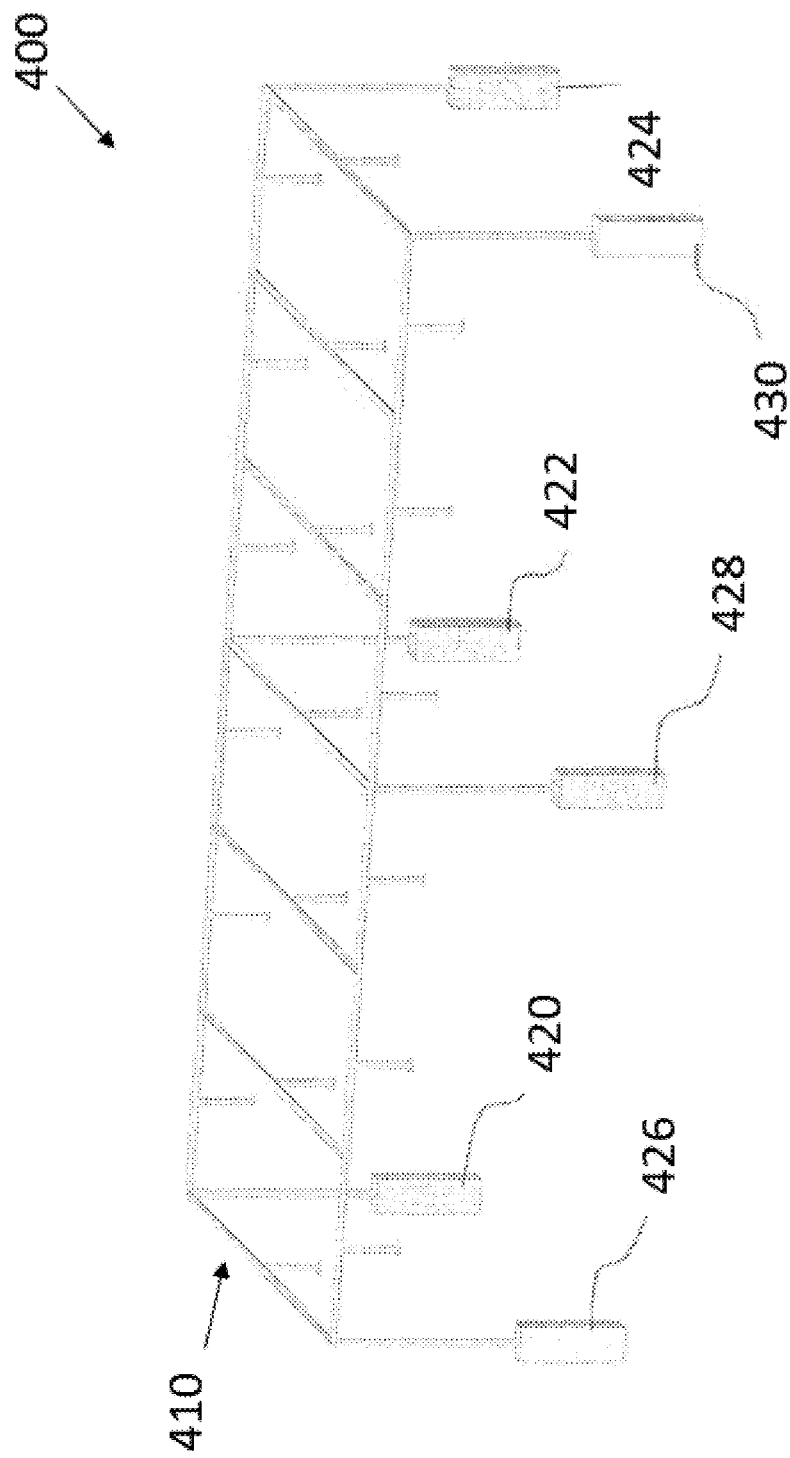
FIG. 4 is an illustration of a dry pipe sprinkler system in accordance with an embodiment.

Within housing 110, the auxiliary drain 120 can be mounted to housing 110, for example, with a pair of U-bolts. Extending from the top of housing 110 is input pipe 123, which is connected in turn to a dry pipe sprinkler system (FIG. 4). Upper valve 124 controls input pipe 123 which then leads into the auxiliary drain 120 (i.e., condensate collection area) via coupling 128. As shown in FIG. 1, a lower drainage valve 144 which, when opened, provides for drainage from the auxiliary drain 120 through drain pipe 146. The drain pipe 146 may include a cap 148, which can be, for example, secured or screwed (i.e., threaded cap) or other connection method onto the end of the drain pipe 146.

In accordance with an exemplary embodiment, the input pipe 123 travels into the housing 110 via pass-through 121, which can be sealed to prevent nuisances such as bees or other unwanted intruders from entering. There may or may not be a seal, a seal may be water resistant or proofed, other protections as known in the art, etc. may be used as desired in various embodiments. Drain pipe 146 travels through pass-through 147 which is also sealed in a similar manner to pass-through 121. The cap 148 can be removed to drain the auxiliary drain 120, desirably in an appropriate procedure that maintains pressurization, as is described, for example, in National Fire Prevention Association (NFPA) 25 guidelines.

In accordance with an embodiment, the cabinet 102 can include a thermometer 136 configured to display the temperature inside the housing 110 of the cabinet 102 though an external dial 137 (FIG. 2B) on the door 112. In various embodiments that temperature may be monitored and an alarm be set to provide warning if the inside temperature fell below a predetermined level. That alarm may be local and/or be sent to a central location as desired. It should be noted that, although exemplary embodiments contain an auxiliary drain 120, it might be desired in other embodiments to provide a retrofit embodiment to install around an existing auxiliary drain 120.

In accordance with an exemplary embodiment, the auxiliary drain and/or condensate collection system 100 can include, for example, a mechanical version (FIGS. 1-2C), which uses a Y-strainer 160 and a drain trap 140. As shown in FIG. 1, the drain trap 140 can be plumbed in parallel to the main collection pipe (i.e., main condensate collection pipe) 122 of the auxiliary drain 120 via a side port 162 on the main collection pipe 122. As water condensation makes its way through the fire system and down to the auxiliary drain 120, the level of condensation will increase until it reaches the side port 162 at which time the condensation will begin to spill over into the drain trap 140 after first passing through the Y-strainer 160. In accordance with an embodiment, the Y-strainer 160 offers a layer of protection to help prevent suspended debris in the condensate from reaching and potentially clogging the drain trap 140. When enough condensation accumulates in the drain trap 140 and Y-strainer 160, a float inside the drain trap 140 will lift off of its seat allowing the accumulated water to exit out of the cabinet 102. When enough water drains from the drain trap 140, the float will reseat closing off the exit path and preventing the dry systems pressurized air from escaping the system. In accordance with exemplary embodiment, the amount of condensation being drained by the system 100 should be relatively minimal and, a secondary drain line 150 connected to a lower portion 141 of the drain trap 140 can be used, for example, in the form of flexible tubing or the like.

In accordance with an exemplary embodiment, this process will continually repeat as more condensate makes its way to the drain trap 140 or until the main collection pipe 122 of the auxiliary drain 120 is manually drained of condensate through the main drain 146. Since the drain trap 140 and/or the Y-strainer 160 will maintain a certain amount of accumulated condensation, it can also be of vital importance that the drain trap 140 also be protected by the insulated and heated cabinet 102, or else, the drain trap 140 would be subject to failure as a result of freezing.

In accordance with an exemplary embodiment, when the auxiliary drain 120 is almost completely full, and the drain trap 140 can allow relatively small amounts of water to drain from the system 100, a level switch 126, by way of a local buzzer light (i.e. an alarm) 143 can alert the user that the auxiliary drain 120 needs attention. In accordance with an embodiment, the drain trap 140 can provide a level of security to the system 100 that eliminates the need for immediate attention.

In accordance with an aspect, the system 100 can also include a cabinet heater 130 configured to be mounted directly to the main collection pipe 122 of the auxiliary drain 120, which can rather easily be installed or removed because with a bracket design that is not tied to the electrical enclosure. Second, an orientation of the heater 130 can be used to maximize component life by vertically mounting the heater with a fan of the heater blowing upward into cabinet 102. For example, the mounting bracket 131 can improve the orientation of the heater 130 in its position to maximize its effectiveness. In accordance with an exemplary embodiment, the mounting bracket 131 can include a deflector 132, which directs the warm air flow coming from the heater 130 onto the main collection pipe 122. For example, instead of simply warming the air inside of the housing 110 of the cabinet 102, the deflector 132 of the mounting bracket 131 focuses the energy (i.e., heat) of the heater 130 onto the main collection pipe 122 thereby maximizing the heat transfer into the pipe 122, which can help ensure that the condensate inside of auxiliary drain pipe 120 will remain liquid even in the coldest climates.

The cabinet 102 also includes an electrical enclosure 170, which contains components for an alarm as well as other components such as circuit protection, a relay and terminal blocks. For example, a local light buzzer 143 can extend through recess 142 in the door 112 of the cabinet 102 and provides an audible sound, for example, a buzzer, and light (i.e., a flashing or solid red light) when the main collection pipe 122 of the auxiliary drain 120 is full of condensate. In other embodiments, it should be noted and as was described above, the alarm may trigger when varying amounts, or any at all, of condensate accumulates. The electrical enclosure 170 is at least a NEMA 4 enclosure in exemplary embodiments as set forth in the National Electrical Manufacturers Association Standards Publication 250-2003. Conduit (not shown) can provides power to the heater 130 and the local light buzzer 143, which in exemplary embodiments is 120V and enters the housing 110 through a pass-through (not shown), which can be sealed similarly to the other pass-throughs 121, 147.

In accordance with an exemplary embodiment, the heater 130 can be sized appropriately, (for example, a 60 Watt (W) heater in tone exemplary embodiments), for example, to provide the interior of housing 110 with an air temperature of from approximately, for example, 40° F. to 60° F., which may be set by thermostat, be preset, allow for setting during or after installation, be set from a central control area, etc.

It should be noted that exemplary embodiments may provide for centralized control as well, with the alarm settings, drainage, heater and other components being monitored and/or manipulated from a central location. Exemplary embodiments may include as well a test device to confirm the alarm and other components are working correctly, which may as well be local and/or activated and/or monitored from a central location.

Figure 3:
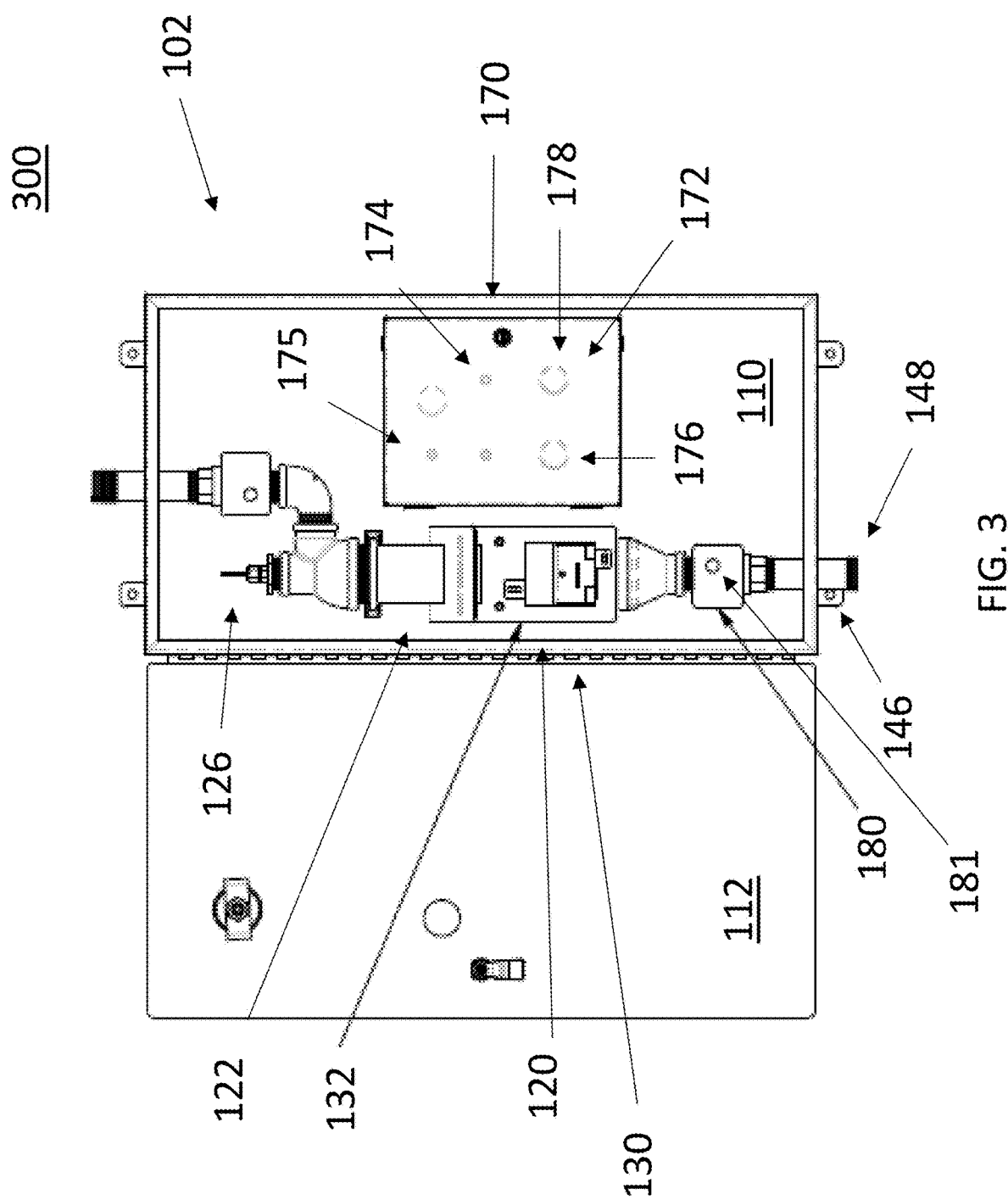
FIG. 3 is front view of the housing for the auxiliary drain and/or condensate collecting system as shown in FIG. 1 with the door open in accordance with another embodiment.

FIG. 3 is front view of the cabinet 102 for the auxiliary drain and/or condensate collecting system 300 with the door open 112 in accordance with another exemplary embodiment. As shown in FIG. 3, an electrical version of the system 300 as shown in FIG. 1 is disclosed that includes a programmable logic controller 172 housed within, for example, the electrical enclosure 170, and a self-draining apparatus comprising an automatic drain 180 and a level switch within auxiliary drain 120 as disclosed above. In accordance with an exemplary embodiment, the automatic drain 180 can include one or more motorized ball valves 181 configured to perform automated draining of an auxiliary drain 120. As disclosed, condensate will slowly accumulate in the main collection pipe 122 of the auxiliary drain 120. Eventually, the condensate level will reach the level switch 126 at the top of the main collection pipe 122. When this happens, the float will lift as before but, in this case, the level switch 126 will close a set of electrical contacts which signal the programmable logic controller 172 that the main collection pipe 122 is full, which will start the automatic draining cycle of the system 300, for example, with the automatic drain 180. In accordance with an exemplary embodiment, the programmable logic controller 172 sequencing can help ensure every valve motion has either reached a fully closed or open position before continuing to the next step. While conducting the drain cycle, the programmable logic controller 172 can also activate a local light buzzer 143 (i.e., an alarm), and closes a pair of trouble contacts which signal a remote panel that the cabinet 102 is executing an automatic drain.

In accordance with an exemplary embodiment, once the drain cycle has successfully completed, the local light buzzer 143 turns off and the trouble contacts open. In order to also provide an indication that an automatic drain cycle has occurred, one of the electrical enclosure's cover lamps 174 can be configured to flash until the system 300 is manually reset. If, however, the cycle does not successfully complete, the local light buzzer 143 will continue to alarm and the trouble contacts will remain closed. Depending on the anomaly, certain lamps 174, 175, for, example, on the cover of the electrical enclosure 170 can flash to provide an indication as to the source of the issue.

The programmable logic controller 172 can also offers other, for example, a semi-automatic drain cycle, a drain override cycle and heater monitor. For example, if the end user wishes to drain condensate from the auxiliary drain 120 before the main collection pipe 122 is full, the user can simply press a drain pushbutton 176 provided for example on the cover of the electrical enclosure 170. The programmable logic controller 172 can then execute an on demand drain cycle to safely empty its contents without any risk of accidentally opening or closing the valves in the wrong order. Therefore, accidentally tripping the sprinkler system can be prevented even for the most unskilled operator.

In addition, there may be an occasional need to simultaneously open both a system and drain valves, such as when the sprinkler system is being depressurized for service. In accordance with an embodiment, the programmable logic controller 172 can be configured to execute this drain override cycle when both cover pushbuttons 176, 178 (i.e., drain valve pushbutton 176 and drain system pushbutton 178) are simultaneously pressed and held, for example, for approximately two (2) seconds to four (4) seconds, perhaps more optimally, for example, for approximately three (3) seconds. Additionally, instead of a relay timer, the programmable logic controller 172 can be coded to activate the local light buzzer 143 and close the trouble contacts when the heater 130 has been continuously active for more than a few hours.

FIG. 4 is an illustration of a dry pipe sprinkler system 400 in accordance with an embodiment. The dry pipe sprinkler system 400 typically includes a network of pipes 410 which are in fluid communication with sprinkler heads (not shown). The network of pipes 410 is filled with a pressurized gas, e.g., air or nitrogen. As disclosed herein, the dry pipe sprinkler system 400 can be used, for example, in parking garages, manufacturing facilities, self-storage facilities, home center garden area and other similar location. As shown in FIG. 4, the dry pipe sprinkler system 400 can include one or more auxiliary drain and/or condensate collecting systems 100 (420, 422, 424, 426, 428, 430) as disclosed herein.

Figure 5:
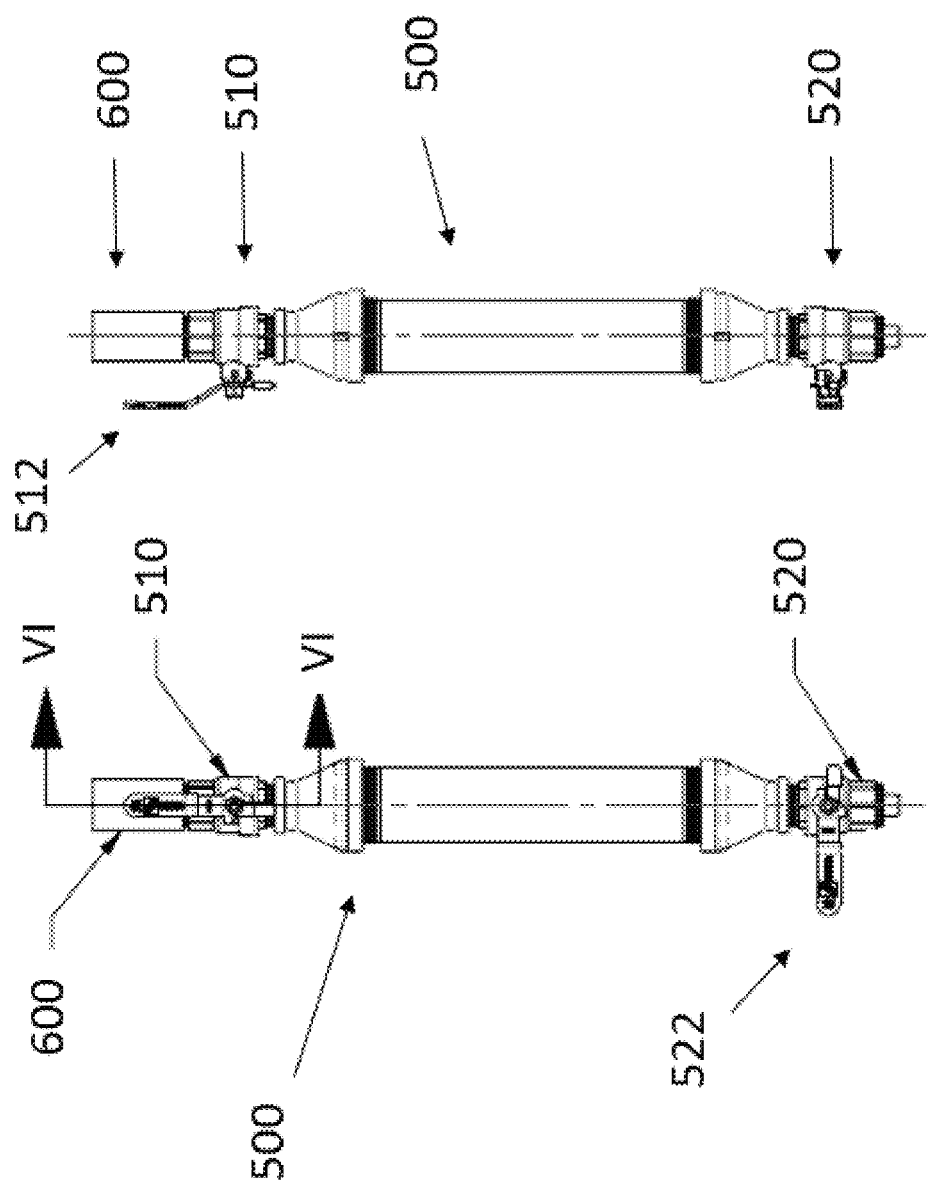
FIG. 5A is a front view of the auxiliary drain in accordance with an exemplary embodiment.
FIG. 5B is a side view of the auxiliary drain as shown in FIG. 5A.

FIGS. 5A and 5B are a front view and a side view, respectively of an auxiliary drain 500 with a flow restrictor valve 600 in accordance with an exemplary embodiment. As shown in FIGS. 5A and 5B, a pair of valves 510, 520, for example, a first valve 510 (i.e., a system valve) and a second valve 520 (i.e., a drain valve) can be provided at an upper portion of the auxiliary drain 500 and at a lower portion of the auxiliary drain 500, respectively. The first or system valve 510 comprises an inlet which communicates with the flow restrictor valve 600 and via the flow restrictor valve 600, the pipes of the dry pipe system 400 (FIG. 4).

In accordance with an embodiment, the first valve 510 can include a valve actuator 512 such as a lever or T-handle, which is arranged to rotate about an axis. For example, the first valve 510 can be a quarter-turn valve with the valve fully open when the valve actuator is aligned with a longitudinal axis of the first valve 510 and with the valve fully closed when the valve actuator has been rotated 90 degrees to position the valve actuator generally perpendicular to the longitudinal axis of the first valve 510.

In accordance with an exemplary embodiment, the second valve 520 similarly has an inlet in communication with the auxiliary drain 500 and an outlet. The second valve 520, like the first valve 510, has a valve actuator 522 such as a lever or T-handle which is arranged to rotate about an axis. In an exemplary embodiment, the valve actuator 522 extends a predetermined distance from the axis. The second valve 520 may be a quarter-turn valve with the valve fully open when the valve actuator 522 is aligned with a longitudinal axis of the second valve 520 from the inlet to the outlet and with the valve fully closed when the valve actuator has been rotated 90 degrees to position the valve actuator generally perpendicular to the longitudinal axis of the second valve 520.

Figure 6:
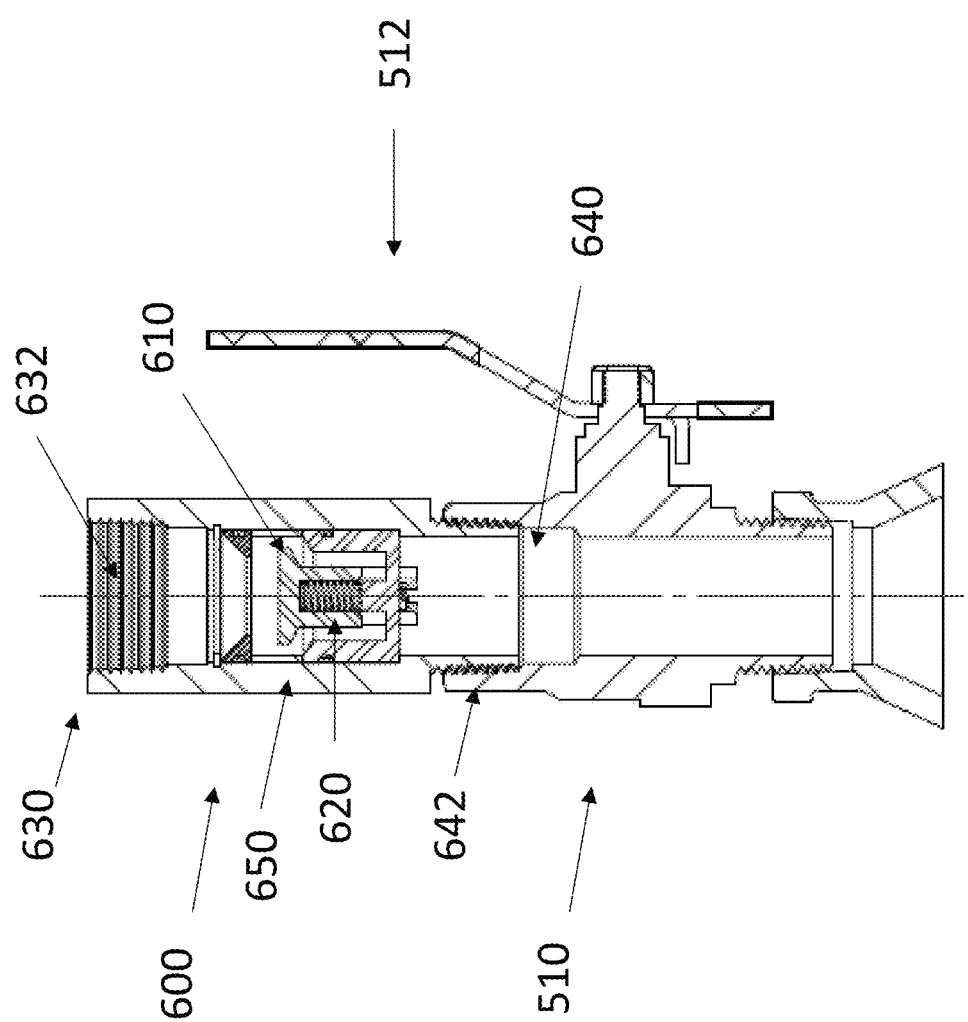
FIG. 6 is a cross sectional view of the first valve and the flow restrictor valve along the line VI-VI in FIG. 5A.

FIG. 6 is a cross sectional view of the first valve 510 and the flow restrictor valve 600 along the line VI-VI in FIG. 5A. As shown in FIG. 6, the flow restrictor valve 600 has a housing 602 and includes an inlet 630 and an outlet 640. The housing 602 can have, for example, a cylindrical shape or a hexagonal shape. The inlet 630 may include a series of internal (e.g., female) threads 632 configured to receive a pipe end (not shown) from a pipe of dry pipe system 400. The outlet 640 includes a series of external (e.g., male) threads 642 configured to be threaded into internal threads (e.g., female) threads of the first valve 510. The inlet 630 being in fluid communication with the outlet 640 via an interior portion 634 of the cylindrical housing 602.

As shown in FIG. 6, a plunger (or shuttle) 610 is held in the open position by a compression spring 620 that allows the flow of a liquid or gas to pass through the valve 600 under typical operating conditions. In accordance with an exemplary embodiment, the typical flow rate of the liquid or gas in the system 400 is slow enough that it does not have enough velocity to overcome the spring's force so the plunger 610 remains in the open position as shown in FIG. 6. If there is a break or unintended opening in the plumbing downstream of the flow restrictor valve 600, the flow rate and velocity will suddenly increase. This large increase in velocity will result in a large increase in the force against the plunger 610, overcoming the resistance of the spring 620 causing the plunger 610 to snap closed against a seat 650, for example, within a fraction of a second. Once closed the plunger 610 can be held in the closed position by the now static pressure of the upstream liquid or gas.

Figure 7:
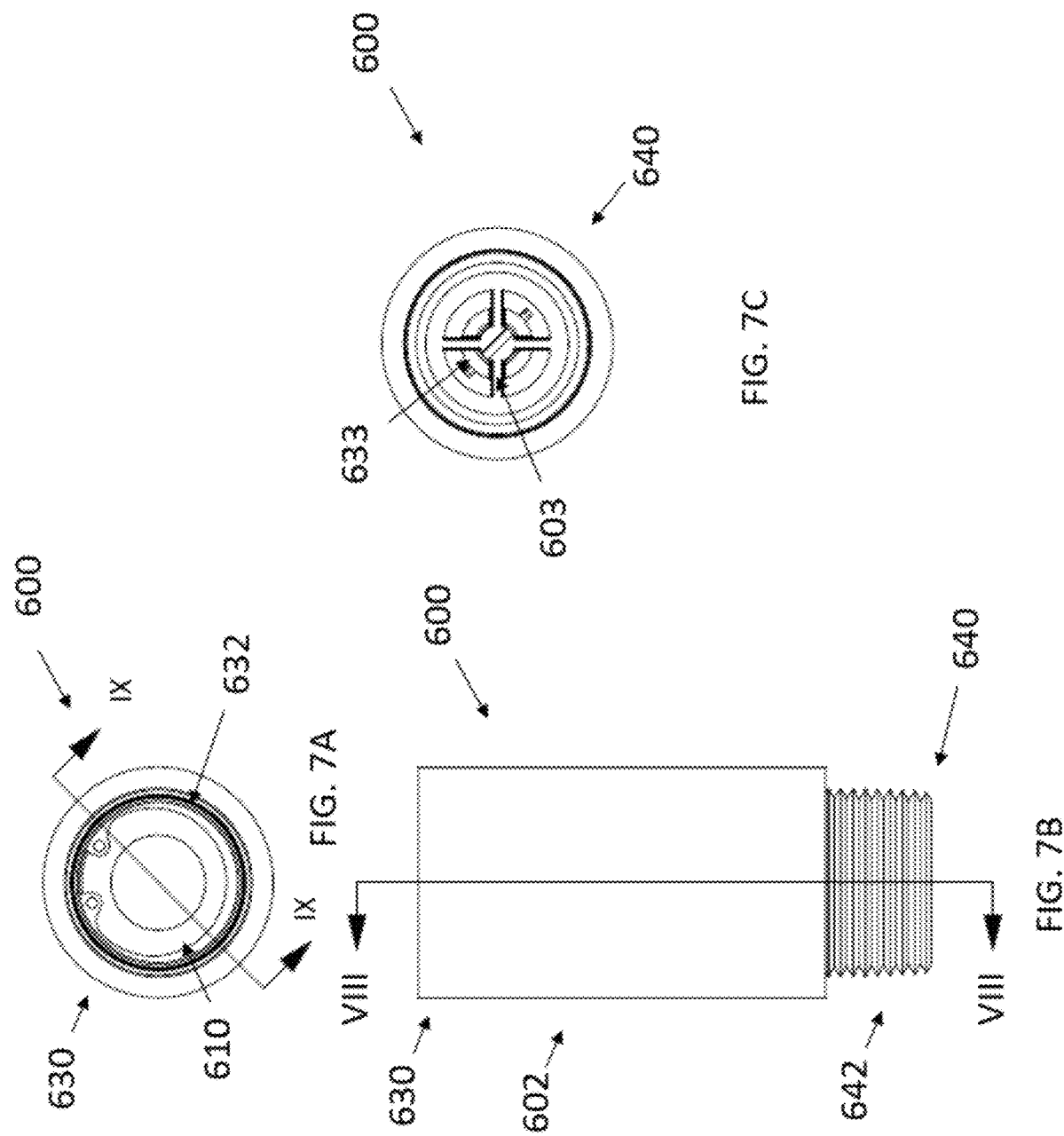
FIG. 7A is a top view of a flow restrictor valve in accordance with an embodiment.
FIG. 7B is a side view of the flow restrictor valve.
FIG. 7C is a bottom view of the flow restrictor valve.

FIG. 7A is a top view of a flow restrictor valve 600 in accordance with an embodiment. As shown in FIG. 7A, the flow restrictor valve 600 has an inlet 630 with a series of internal (e.g., female) threads.

FIG. 7B is a side view of the flow restrictor valve 600. As shown in FIG. 7B, the flow restrictor valve 600 has a housing 602 and a series of external (e.g., male) threads 642 on the outlet end 640 of the valve 600. In accordance with an exemplary embodiment, the external threads 642 are, for example, 1" NPT (National Pipe Thread).

FIG. 7C is a bottom view of the flow restrictor valve 600. As shown in FIG. 7C, the flow restrictor valve 600 allows condensate and/or water to flow through a plurality of openings 633 within the retaining member 603 to the outlet 640 of the flow restrictor valve 600.

Figure 8:
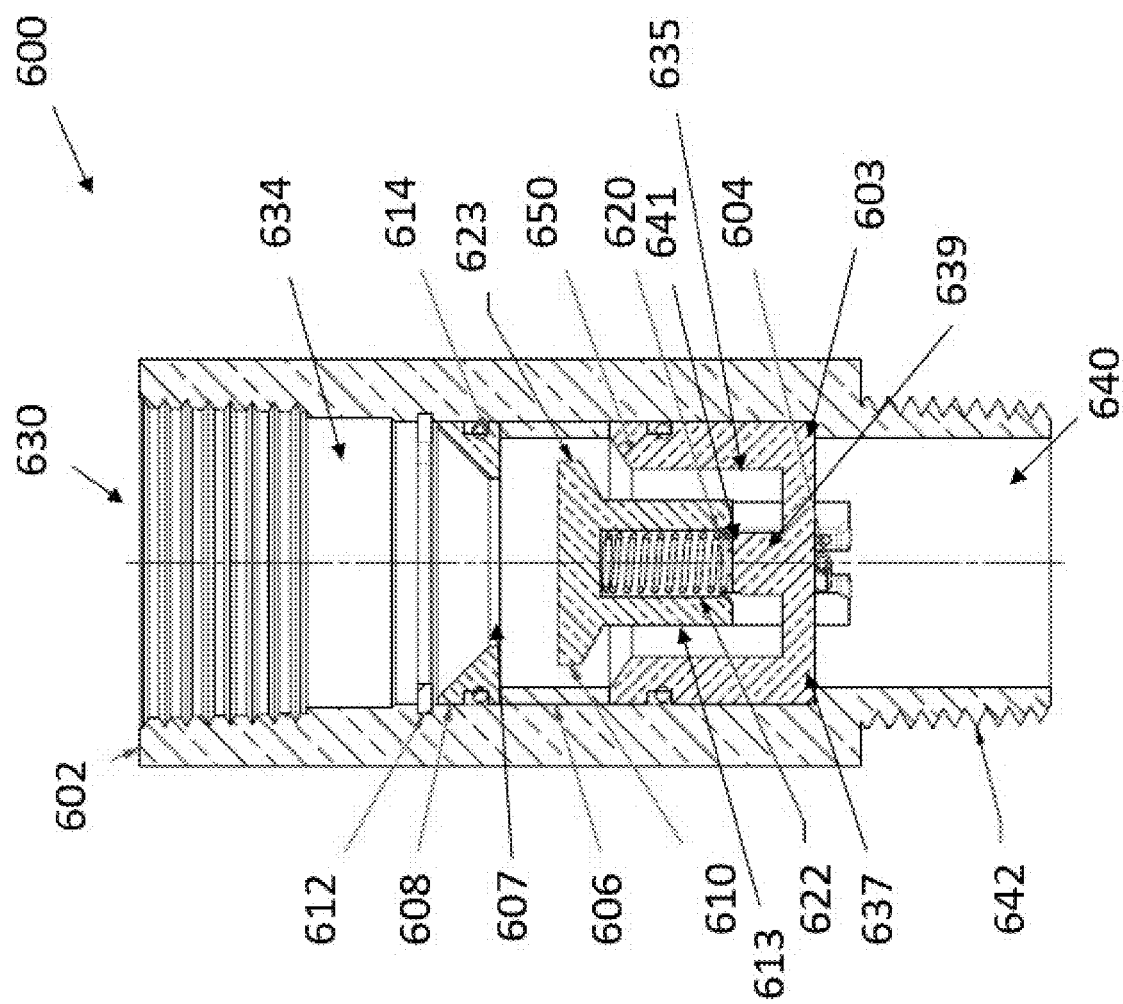
FIG. 8 is a cross sectional view of the flow restrictor valve along the line VIII-VIII in FIG. 7B in an open position.

FIG. 8 is a cross sectional view of the flow restrictor valve 600 along the line VIII-VIII in FIG. 7B in the open position. The flow restrictor valve 600 includes an inlet 630 in fluid communication with an outlet 640. The interior portion 634 of the valve 600 includes a retaining ring 612, an accelerator 608, a spacer 606, an O-ring 614, the plunger 610, a pin 604, and the spring 620. The retaining ring 612 is located on an inner surface of the valve 600 and configured to retain the accelerator 608, the spacer 606, the O-ring 614, the plunger 610 and the spring 620 within the interior portion 634 of the valve 600. The spacer 606 is arranged between a lower edge (i.e., slightly smaller diameter passageway 607) of the accelerator 608 and an upper edge of a retaining member 603 configured to house the plunger 610 and the compression spring 620.

The retaining member 603 includes an inner annular side wall 635 and a base portion 637 having a plurality of openings 633 (FIG. 7C) configured to retain the spring 620 and allow condensate and/or water to reach the outlet 640. The retaining member 603 also include an inner annular protrusion 639, which extends upward from the base portion 637 and provides a platform 641 for the spring 620 to be compressed downward when the flow restrictor valve 600 is in a closed portion.

In accordance with an exemplary embodiment, the spring 620 can be enclosed in a protective shroud 622 formed by the downstream side 613 of the plunger 610. Any contaminated liquid will move past this location and be prevented from depositing on the spring 620 because it is not in the condensate's flow path. In addition, the shroud 622 will naturally form a protective pocket of captured air which is an important feature because an auxiliary drain 120 may be allowed to overfill due to lack of maintenance. If the liquid level reaches the flow restrictor valve 600, the spring 620 will remain dry because of this protective air pocket.

Figure 9:
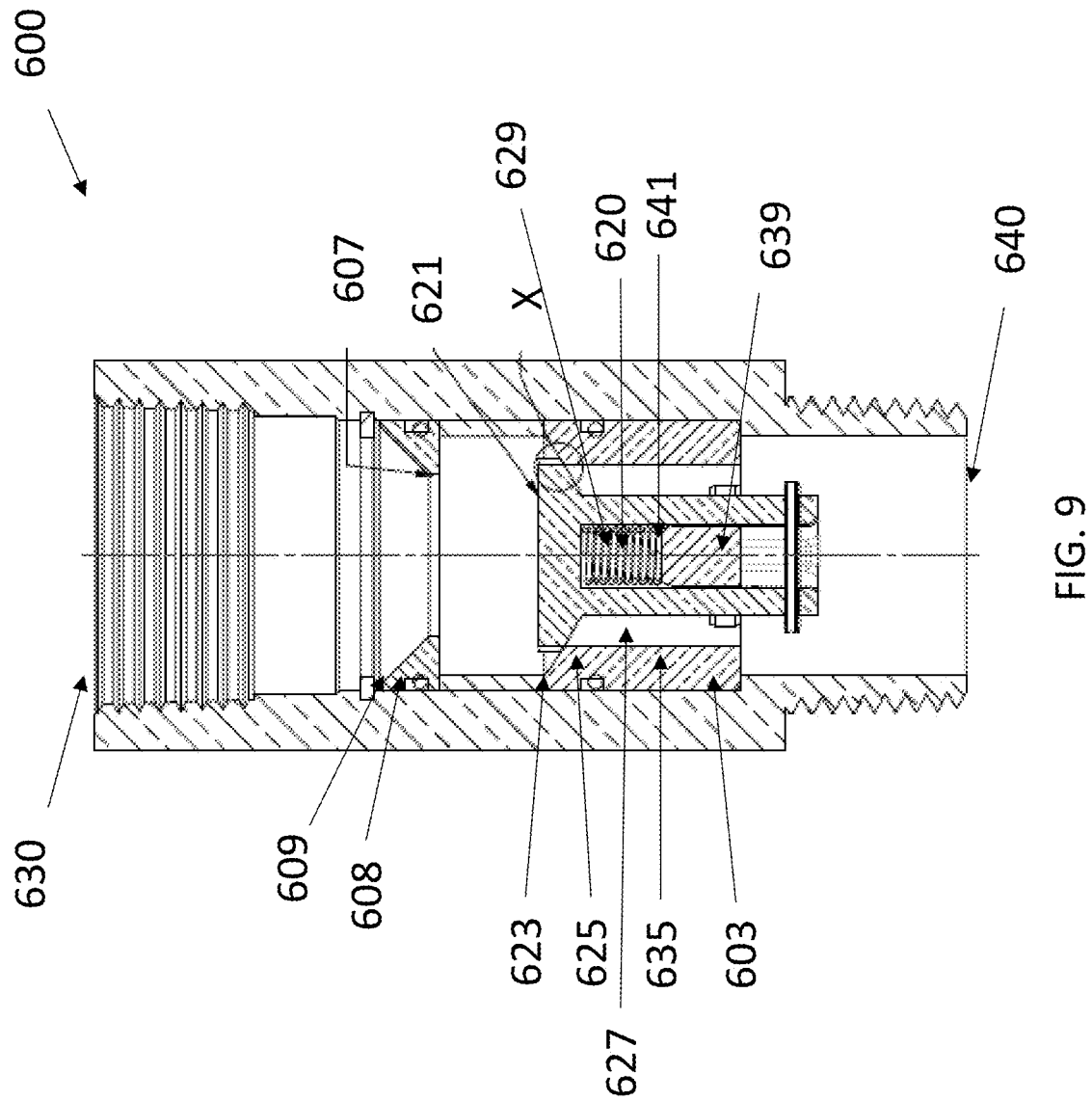
FIG. 9 is a cross sectional view of the flow restrictor valve along the line IX-IX in FIG. 7A in a closed position.

FIG. 9 is a cross sectional view of the flow restrictor valve 600 along the line IX-IX in FIG. 7A in the closed position. As shown in FIG. 9, the accelerator 608 is an annular member having a slightly smaller diameter passageway 607 on a lower portion of the annular member and immediately upstream of the plunger 610. The accelerator 608 has an upper diameter 609 that is greater than the lower diameter passageway 607 to accelerate a flow of water towards the plunger 610 to help ensure that the velocity immediately before the plunger 610 is high enough to guaranty the force generated is enough to close the plunger 610. In accordance with an exemplary embodiment, any water moving toward the flow restrictor valve 600 during a rupture (or fully open AD) will be forced through this slightly restricted passageway 607 and naturally accelerate to the point of generating enough force to close the plunger 610. While measurably smaller than the inside diameter of the pipe, the passageway 607 of the accelerator 608 is still large enough that it will not clog with condensate debris and since there are no sprinklers downstream of the auxiliary drain 120, such that a reduced inside pipe diameter does not compromise the system 400.

In accordance with an exemplary embodiment, the plunger 610 includes an upper platform 621 having a relatively flat upper surface, an annular side wall 623 having a relatively vertical surface parallel with the flow through the valve, a tapered side wall 625, and an annular lower portion 627 having a hollow inner portion 629, which is configured to receive and form the protective shroud 622 for the spring 620.

As previously mentioned, the condensate which exists in a dry sprinkler system will likely contain corrosion and other clogging debris, which may necessitate the need for a relatively larger passageways through the flow restrictor valve 600. In addition, the failure created by a freeze and break may not be as large as an open valve and it may not be a major rupture such as would be created from a severed natural gas line. In both cases there is a risk of not having enough velocity when needed to overcome the spring's force and close the flow restrictor valve 600. In accordance with an exemplary embodiment, a lighter compression spring 620, for example, which needs less force to close the plunger 610 can be used.

Figure 10:
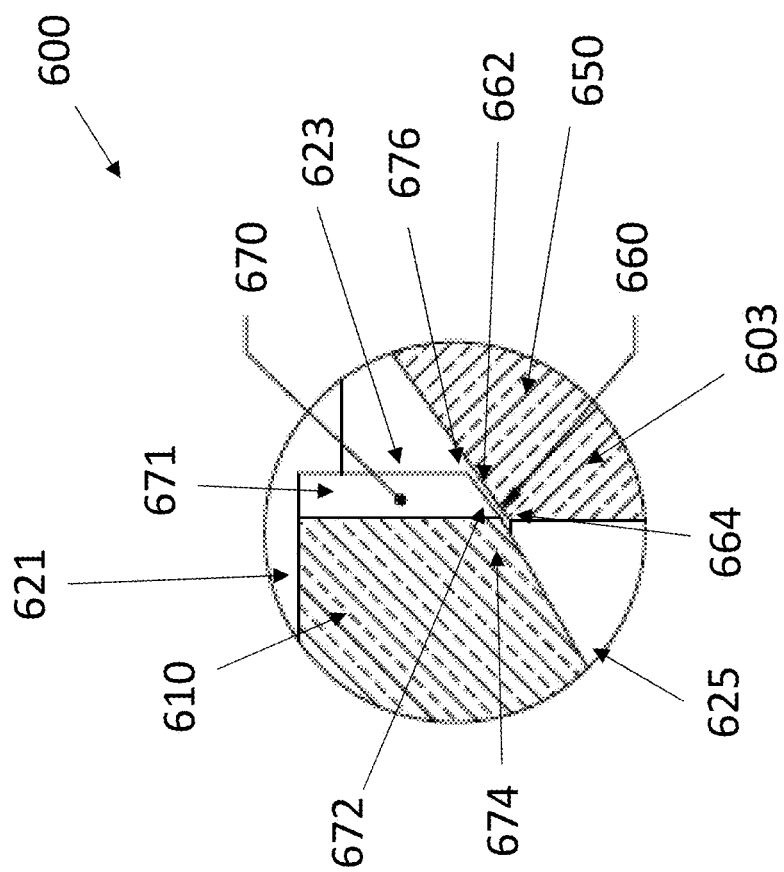
FIG. 10 is a detailed sectional view of the section X of FIG. 9.

FIG. 10 is a detailed view of the section X of FIG. 9. As shown in FIG. 10, a sealing interface 660 between the plunger 610 and a seat 650 of the retaining member 603 is disclosed that is designed to be an edge contact. Instead of having the same tapered angle, the angle between a lower surface 672 of the plunger 610 and an upper edge 662 of the retaining member 603 can differ, for example, by a few degrees, for example, 1 degrees to 10 degrees, and more perhaps more optimally, 2 degrees to 5 degrees. In accordance with an embodiment, a taper 664 of the seat 650 of the retaining member 603 is at a steeper angle (i.e., greater angle) than a taper 674 of the plunger 610. In accordance with an exemplary embodiment, the difference in tapers 664, 674 of the seat 650 of the retaining member 603 and the plunger 610 can cause the sealing force to be focused on an outer edge portion 676 of the plunger 610 instead of distributing it across the entire sealing face, which not only creates a consistent level of contact force, but it also reduces the likelihood of contamination keeping the two parts from touching each other when there is a buildup on the face of the seat. In accordance with an exemplary embodiment, for example, the edge contact will knife through this debris because the force is focused on a relatively significantly smaller area.

In accordance with an exemplary embodiment, a consistent level of sealing can be beneficial, however, a perfect one may not desirable. For example, there may be several auxiliary drains 120 in a dry system, and it may not be obvious as to which auxiliary drain 120 has been compromised by a freeze and break. While the flow restrictor valve 600 is designed to prevent the catastrophe associated with a wide-open auxiliary drain failure, a small flow of water from the broken auxiliary drain 120 can provide a relatively easy indication as to which location has been compromised. In addition, even after the water supply has been turned off and the system depressurized, the column of water above the flow restrictor valve 600 must be drained down for the plunger 610 to reopen. A minimal and controlled amount of water flowing passed the flow restrictor valve 600 will slowly remove the water weight above it and eventually cause the valve's plunger 610 to reopen. For these reasons the design includes one or more notches 670, for example, two or more notches 670 cut into the outer edge (i.e., outer sealing edge) 671 of the plunger 610. The size of the notches 670, along with the difference in taper of the plunger 610 to seat 650, creates a consistent and small relief path for the water to move passed the flow restrictor valve 600 in a predictable manner. In accordance with an embodiment, the one or more notches 670 may be a relatively flat surface on the circumference of the plunger 610. Additionally, the use of notches 670 may be more advantageous, for example, than a small diameter bleed hole in the plunger 610, since a rather small hole can become clogged rather easily by condensate debris.

The principles, exemplary embodiments and mode of operation of the present invention have been described in the foregoing specification. However, the invention which is intended to be protected is not to be construed as limited to the particular embodiments disclosed. The embodiments are therefore to be regarded as illustrative rather than as restrictive. Variations and changes may be made without departing from the spirit of the present invention. Accordingly, it is expressly intended that all such equivalents, variations and changes which fall within the spirit and scope of the present invention as defined in the claims be embraced thereby.

What is claimed is:

1. A system for maintaining the integrity of a dry pipe sprinkler system, comprising:
    an auxiliary drain including a main collection pipe;
    a heater including a bracket and a fan, wherein the bracket is (i) configured to attach the heater directly to the main collection pipe of the auxiliary drain such that the heater is mounted with the fan blowing in an upward direction, and (ii) includes a deflector that focuses heat from the heater onto the main collection pipe increasing heat transfer into the main collection pipe; and
    a self-draining apparatus configured to receive excess water from the auxiliary drain.

2. The system according to claim 1, wherein the self-draining apparatus comprises:
    a Y-strainer in communication with a side port of an upper portion of the auxiliary drain, the Y-strainer configure to receive the excess water from the main collection pipe of the auxiliary drain;
    a drain trap arranged in parallel to the auxiliary drain and in communication with the Y-strainer, the drain trap having a float configured to release water from the drain trap upon the float lifting off a seat within the drain trap; and
    a drain tube extending from a lower portion of the drain trap and configured to receive the water released from the drain trap.

3. The system according to claim 1, wherein the self-draining apparatus comprises:
    a programmable logic controller configured to receive a signal from a level switch within the auxiliary drain when the excess water is detected in the main collection pipe of the auxiliary drain; and
    an automatic drain arranged on a lower portion of the auxiliary drain and configured to receive a signal from the programmable logic controller to release at least a portion of the excess water within the auxiliary drain though a drain pipe connected to the automatic drain.

4. The system according to claim 3, wherein the automatic drain comprises one or more motorized ball valves configured to release water from the main collection pipe of the auxiliary drain.

5. The system according to claim 1, further comprising;
    an input pipe;
    a first valve configured to control fluid passage from the input pipe into the main collection pipe of the auxiliary drain;
    a second valve configured to control fluid passage from the main collection pipe of the auxiliary drain into a drain pipe; and
    an insulated housing with a door configured to provide a heat controlled environment, and wherein the auxiliary drain, the heater, and the self-draining apparatus are located within the housing.

6. The system according to claim 1, further comprising:
    an alarm configured to provide a warning when the auxiliary drain retains a predetermined amount of condensate.

7. The system according to claim 5, wherein the insulated housing is weather resistant.

8. The system according to claim 5, wherein the door of the insulated housing is configured to be locked.

9. The system according to claim 1, wherein the heater is thermostatically controlled.

10. The system according to claim 1, further comprising:
    a flow restrictor valve, the flow restrictor valve including a plunger configured to be held in an open position by a compression spring, the open position configured to allow a liquid or gas to flow through the flow restrictor valve and a closed position in which a flow of the liquid or gas generates a velocity sufficient to cause the compression spring to compress and engage an outer edge of the plunger with a seat of a retaining member to prevent the flow of the liquid or gas through the flow restrictor valve.

11. The system according to claim 10, wherein the flow restrictor valve is arranged on an upstream side of the auxiliary drain.

12. The system according to claim 10, wherein the plunger includes one or more notches in an outer edge thereof to allow at least a portion of the gas or liquid to flow through the flow restrictor valve when the flow restrictor valve is in the closed position; and
    an accelerator configured to increase the flow of the gas or liquid onto the plunger with a reduced diameter passageway arranged immediately upstream of the plunger.

13. The system according to claim 10, wherein a downstream portion of the plunger forms a protective shroud configured to protect the compression spring.

14. A method for maintaining the integrity of a dry pipe sprinkler system, comprising:
    providing an auxiliary drain including a main collection pipe;
    directly attaching a heater having a bracket and a fan to the main collection pipe of the auxiliary drain such that the heater is mounted with the fan blowing in an upward direction, wherein the bracket includes a deflector that focuses heat from the heater onto the main collection pipe increasing heat transfer into the main collection pipe; and
    releasing excess water from the auxiliary drain with a self-draining apparatus, the self-draining apparatus configured to receive the excess water from the auxiliary drain.

15. The method according to claim 14, wherein the self-draining apparatus includes a drain trap arranged in parallel to the auxiliary drain and in communication with a Y-strainer, the drain trap having a float configured to release water from the drain trap upon the float lifting off a seat within the drain trap, and a drain tube extending from a lower portion of the drain trap and configured to receive the water released from the drain trap, the method further comprising:
    directing the excess water from the main collection pipe of the auxiliary drain through the Y-strainer into the drain trap;
    directing the excess water through the drain trap into the drain tube; and
    releasing the excess water from the dry pipe sprinkler system via the drain tube.

16. The method according to claim 14, wherein the self-draining apparatus includes (i) a programmable logic controller configured to receive a signal from a level switch within the auxiliary drain when the excess water is detected in the main collection pipe of the auxiliary drain, and (ii) an automatic drain arranged on a lower portion of the auxiliary drain and configured to receive a signal from the programmable logic controller to release at least a portion of the excess water within the auxiliary drain though a drain pipe connected to the automatic drain.

\* \* \* \* \*